(12) United States Patent
Fujita

(10) Patent No.: US 8,041,182 B2
(45) Date of Patent: Oct. 18, 2011

(54) COMMUNICATION DEVICE AND CONTROL METHOD

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1617 days.

(21) Appl. No.: 11/283,740

(22) Filed: Nov. 22, 2005

(65) Prior Publication Data

US 2006/0072004 A1    Apr. 6, 2006

Related U.S. Application Data

(63) Continuation of application No. PCT/JP2004/018828, filed on Dec. 16, 2004.

(30) Foreign Application Priority Data

Dec. 17, 2003    (JP) .................................. 2003-420210

(51) Int. Cl.
*H04N 5/765* (2006.01)
(52) U.S. Cl. ...................................... 386/232
(58) Field of Classification Search ...................... 386/90
See application file for complete search history.

(56) References Cited

U.S. PATENT DOCUMENTS 7,032,059 B1 *  4/2006  Yamada et al. ............... 710/313

FOREIGN PATENT DOCUMENTS

| CN | 1274230 A | 11/2000 |
|---|---|---|
| EP | 1 052 574 A2 | 11/2000 |
| JP | 11-346345 | 12/1999 |
| JP | 2000-311438 | 11/2000 |
| JP | 2001-275076 | 10/2001 |
| JP | 2001-344897 | 12/2001 |
| JP | 2003-339005 | 11/2003 |

OTHER PUBLICATIONS

1394 Trade Association, TA Document 2001017, AV/C Tape Recorder/Player Subunit, Specification 2.2 (Dec. 11, 2001).
1394 Trade Association, TA Document 1999026, AV/C Digital Interface Command Set General Specification Version 4.0 (Jul. 23, 2001).
Feb. 1, 2005 International Search Report in PCT/JP2004/018828.
Sep. 7, 2006 Written Opinion in PCT/JP2004/018828.
Aug. 8, 2008 Chinese Official Action in Chinese Patent Appln. No. 200480041822.9 (with English-language translation).
Oct. 4, 2007 Supplementary European Search Report in EP 04 80 7187.

* cited by examiner

*Primary Examiner* — Peter-Anthony Pappas
*Assistant Examiner* — Daniel Tekle
(74) *Attorney, Agent, or Firm* — Fitzpatrick, Cella, Harper & Scinto

(57) ABSTRACT

A communication apparatus comprising a digital interface and a detecting unit configured to detect a change in format of video data transmitted from the digital interface, wherein the communication apparatus is adapted to control the digital interface to set the digital interface in a disabled state in case of detecting by the detecting unit that the format of video data is changed.

12 Claims, 10 Drawing Sheets

FIG. 6

| APT2 | APT1 | APT0 | Meaning |
|---|---|---|---|
| 0 | 0 | 0 | DV format |
| 0 | 0 | 1 | Reserved |
| 0 | 1 | 0 | Reserved |
| 0 | 1 | 1 | Reserved |
| 1 | 0 | 0 | Reserved |
| 1 | 0 | 1 | Reserved |
| 1 | 1 | 0 | Reserved |
| 1 | 1 | 1 | HD format | dure of the digital video camera according to the second embodiment; and
COMMUNICATION DEVICE AND CONTROL METHOD This application is a continuation of International Application No. PCT/JP2004/018828 filed Dec. 16, 2004.

TECHNICAL FIELD

The present invention relates to a communication apparatus or the like which is capable of outputting video data in different type formats.

BACKGROUND ART

A DVC (digital video camera), which is compliant with DV format proposed by HD Digital VCR Conference, is conventionally known. The DV format defines HD (High Definition), SD (Standard Definition) and SDL (Standard Definition Long).

Also, at the present, a video recorder which records compressed video data in a plurality of different compression formats on the same recording medium (e.g., a magnetic tape) has been proposed. For example, in the Patent Document 1 (the specification of Japanese Patent Application Laid Open No. 2001-275076), a video recorder is proposed, in which standard definition video data are compressed in accordance with the DV format, high definition video data are compressed in accordance with the MPEG2 format, and both of the compressed data are recorded on the same recording medium. In the present specification, standard definition video data compressed in DV format are called "SD video data", and high definition video data compressed in MPEG2 format are called "HD video data".

Also, there is a DVC which is able to be connected to a serial bus compliant with IEEE 1394 standard (refer to the Nonpatent Literature 1 (IEEE Std 1394-1995, IEEE Std 1394a-2000) and the like), and is compliant with AV/C Tape Recorder/Player Subunit defined by 1394 Trade Association (for example, refer to the Nonpatent Literature 2 ("TA Document 2001017, AV/C Tape Recorder/Player Subunit Specification 2.2, Dec. 11, 2001, 1394 Trade Association")). Such DVC can be also controlled from PC (personal computer).

Also a PC is able to recognize a status of a DVC that is compliant with AV/C Tape Recorder/Player Subunit. For example, the PC can obtain the format of data output from DVC by using OUTPUT PLUG SIGNAL FORMAT status command as shown in FIG. 2 (refer to the Nonpatent Literature 3 ("AV/C Digital Interface Command Set General Specification Version 4.0, 1394 Trade Association"))

Patent Document 1: Japanese Patent Application Laid Open No. 2001-275076

Nonpatent Literature 1: IEEE Std 1394-1995, IEEE Std 1394a-2000

Nonpatent Literature 2: TA Document 2001017, AV/C Tape Recorder/Player Subunit Specification 2.2, Dec. 11, 2001, 1394 Trade Association Nonpatent Literature 3: AV/C Digital Interface Command Set General Specification Version 4.0, 1394 Trade Association

DISCLOSURE OF INVENTION

Problems to be Solved by the Invention

However, the conventional art described above involves a number of problems. For example, a PC can not appropriately cope with changes in format of reproduced video data output from a DVC.

If PC receives SD video data from DVC, the DV driver that is a driver program for DV format must be loaded in the PC. Also, when the PC receives HD video data from DVC, the MPEG2 driver for MPEG2 format must be loaded in the PC. However, if HD video data are output after loading the DV driver, the PC will decode the HD video data using the DV driver, and this causes problems such as freeze of the PC. Similarly, if SD video data are output after the PC loaded the MPEG2 driver, the above problem will occur.

An object of the present invention is to overcome the above-described drawbacks. For example, an object of the present invention is to provide an apparatus and a method capable of flexibly supporting a change in the format of reproduced video data.

Means of Solving the Problems

According to one aspect of the present invention, there is provided a communication apparatus, comprising: a digital interface; and detecting means for detecting a change in format of video data transmitted from the digital interface, wherein the communication apparatus is adapted to control the digital interface to set the digital interface in a disabled state in case of detecting by the detecting means that the format of video data is changed.

Also, according to another aspect of the present invention, there is provided a control method of a communication apparatus having a digital interface, comprising: a detecting step of detecting a change in format of video data transmitted from the digital interface; and a control step of controlling the digital interface to set the digital interface in a disabled state in case of detecting in the detecting step that the format of video data is changed.

Other features and advantages of the present invention will be apparent from the following description taken in conjunction with the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a diagram useful in describing an example of an application ID in a TIA (Track Information Area) in FIG. 5;

BAST MODE FOR CARRYING OUT THE INVENTION

Preferred embodiments of the present invention will now be described in detail with reference to the accompanying drawings.

In the following embodiments, a format of video data output from video processing apparatus such as a digital video camera is referred to as the "output format". Also, a mode in which the format of data output from video processing apparatus such as a digital video camera is locked (fixed) to a certain format is referred to as the "lock mode". A mode in which the format of data output from video processing apparatus such as a digital video camera is not locked (fixed) to any format is referred to as the "un-look mode". Especially, a lock mode in which the output format is locked to DV format is called as the "DV lock mode", and a lock mode in which the output format is locked to MPEG2 format is called as the "MPEG2 lock mode".

FIRST EMBODIMENT

Figure 1:
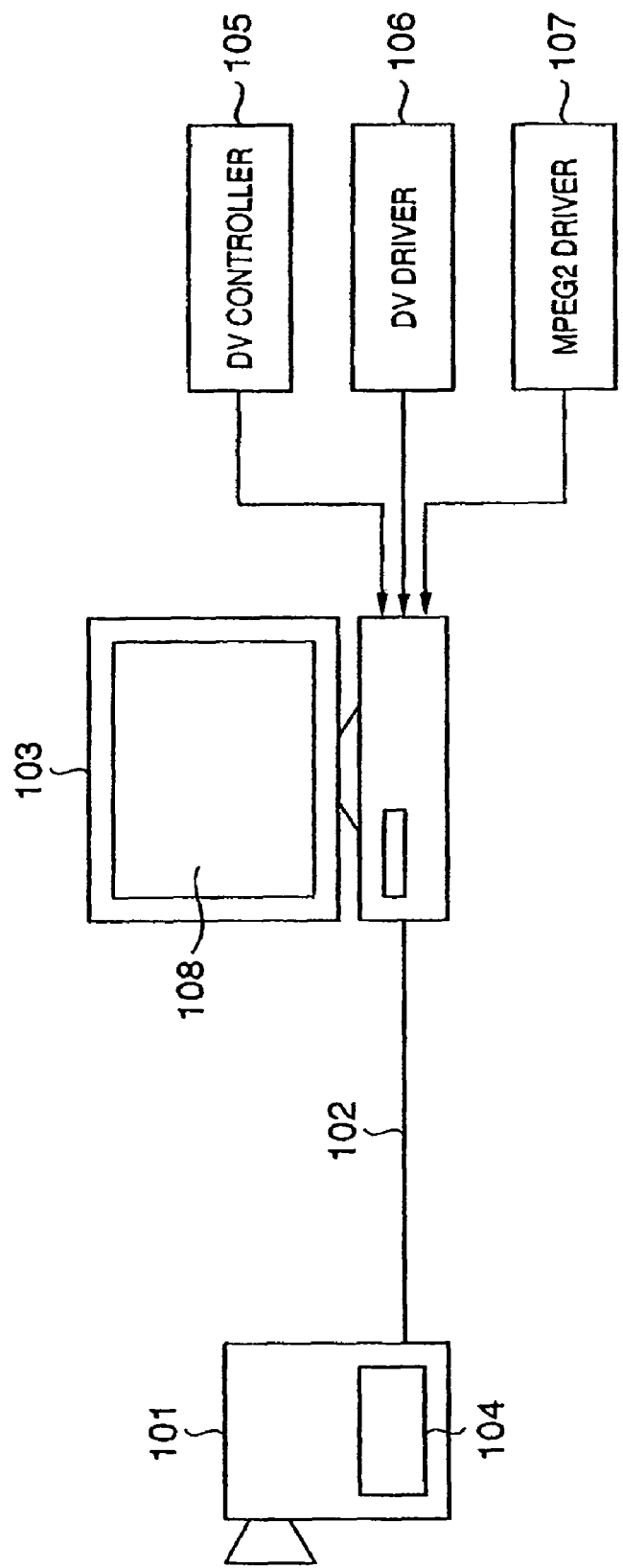
FIG. 1 is a diagram illustrating the configuration of a video playback system according to a first to a third embodiment of the present invention.

FIG. 1 is a diagram illustrating the configuration of a video playback system in a first embodiment of the invention. As shown in FIG. 1, the system includes a DVC (digital video camera) 101, which is one example of a video processing apparatus; an IEEE 1394 serial bus 102, which is a serial bus compliant with IEEE 1394 standard; a PC (personal computer) 103, which is one example of a control apparatus; a recording medium (a magnetic tape in this embodiment) 104 capable of being mounted in the DVC 101; a DV controller 105, which is application software for remote controlling the DVC 101; a DV driver 106, which is a driver program for the DV format; and an MPEG2 driver 107, which is a driver program for the MPEG2 format. The DV driver 106 is capable of processing SD video data, and the MPEG2 driver 107 is capable of processing HD video data. It is assumed here that the DV controller 105, DV driver 106 and MPEG2 driver 107 have been pre-installed in the PC 103. The PC 103 remote controls the DVC 101 using the DV controller 105, DV driver 106 and MPEG2 driver 107 and displays SD video data or HD video data, which has been output from the DVC 101, on a monitor 108. Also, the DVC 101 is compliant with the Non-patent Literature 2 (TA Document 2001017, AV/C Tape Recorder/Player Subunit Specification 2.2, Dec. 11, 2001, 1394 Trade Association) described above.

Figure 9:
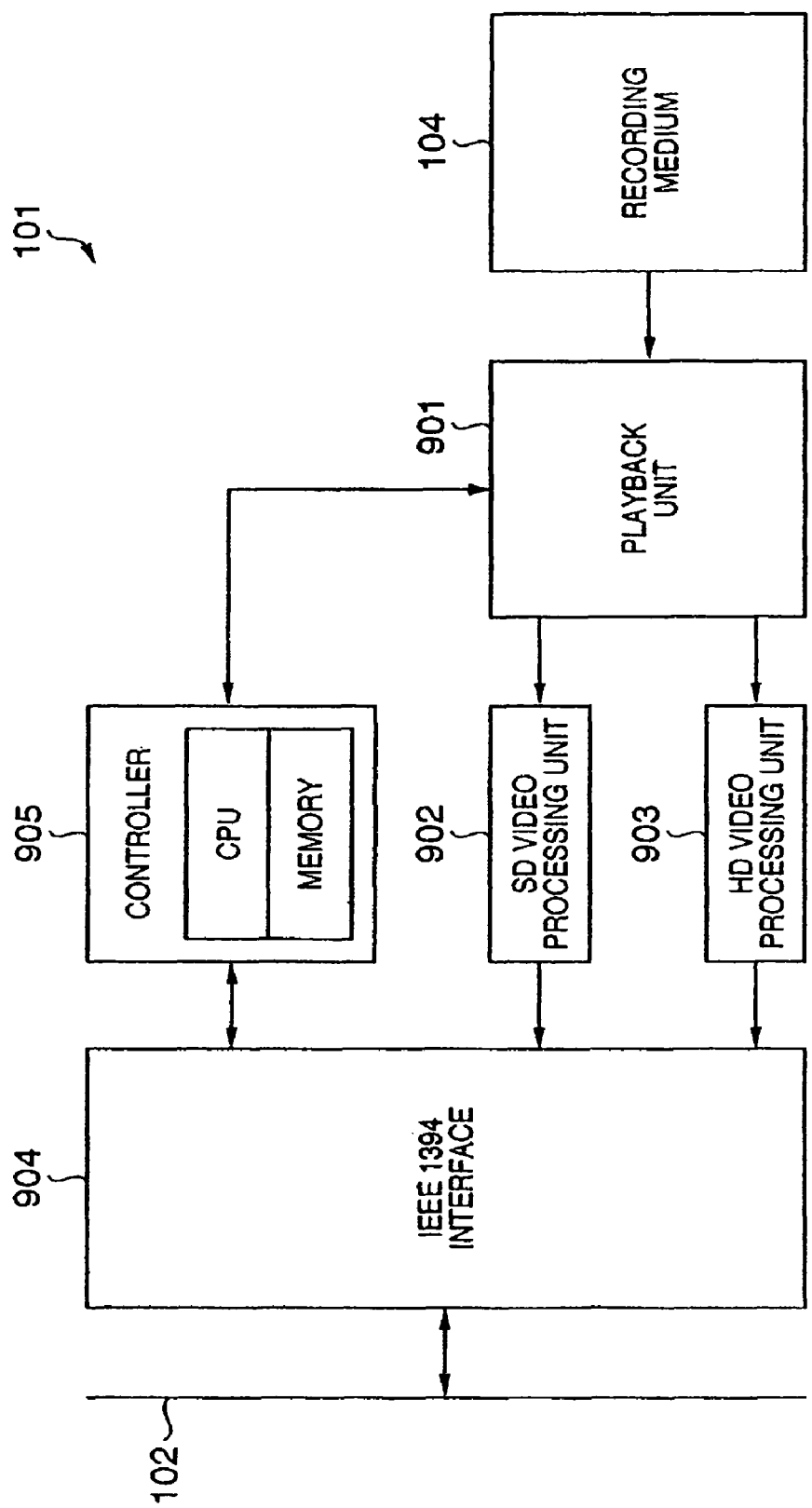
FIG. 9 is a block diagram illustrating the structure of a digital video camera according to the first to the third embodiment.

FIG. 9 is a diagram illustrating some of the structural elements of the DVC 101. The DVC 101 includes a playback unit 901 for reproducing video data that has been recorded on the recording medium 104; an SD video processing unit 902 for packetizing SD video data reproduced from the recording medium 104 into isochronous packets; an HD video processing unit 903 for packetizing HD video data reproduced from the recording medium 104 into isochronous packets; an IEEE 1394 interface 904, which is a digital interface compliant with IEEE 1394 standard; and a controller 905 having a CPU (Central Processing Unit) and a memory storing a program (a program for controlling the DVC 101) executable by the CPU. The controller 905 has a function for discriminating the type of data format of video data reproduced from the recording medium 104.

Figure 3:
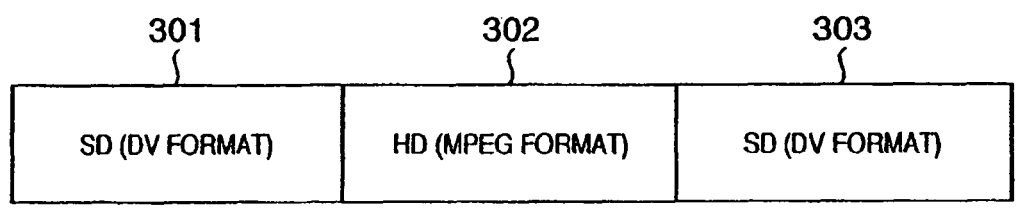
FIG. 3 is a diagram useful in describing recording tape as a recording medium on which data in SD video data and HD video data has been recorded in mixed form.

FIG. 3 is a diagram illustrating an example of video data that has been recorded on the recording medium 104. In the first embodiment, a case where the recording medium 104 is a magnetic tape is described. However, it goes without saying that the recording medium 104 is not limited to a magnetic tape. In FIG. 3, the reference numerals 301, 303 denote the SD video data and the reference numeral 302 denotes the HD video data. If the recording medium 104 continues to be played back in the forward direction starting from the leading end, the items of SD video data 301, HD video data 302 and SD video data 303 are reproduced in the order mentioned.

Further, in this embodiment, it is assumed that the SD video data 301, 302 is a video data which is processed according to the DV format and that the HD video data 302 is a video data which is processed according to the MPEG2 format. The DVC 101, which is connected to the PC 103 via the IEEE 1394 serial bus 102 as shown in FIG. 1, is controlled in accordance with various commands from the PC 103 and outputs video data reproduced from the recording medium 104 as isochronous data from an IEEE 1394 terminal.

Figure 4A:
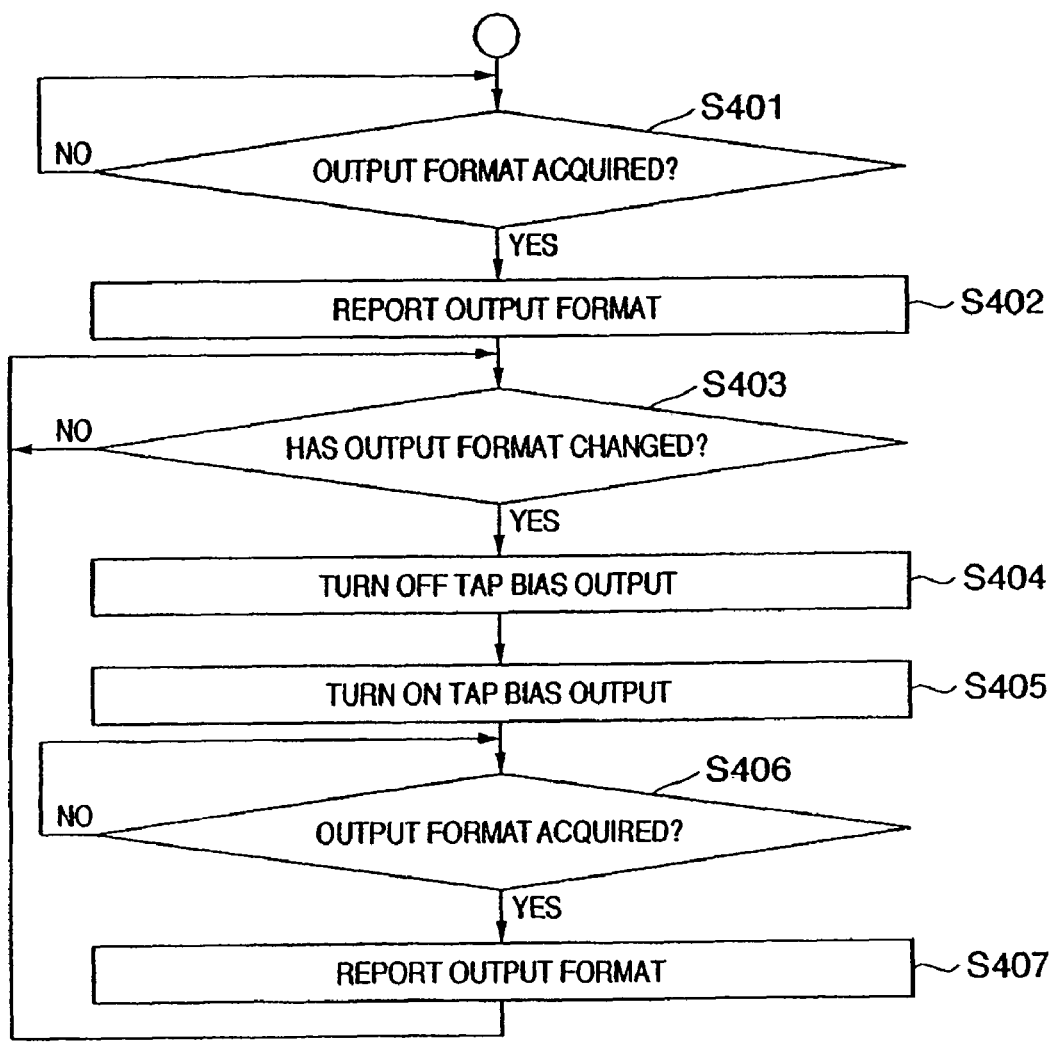
FIG. 4A is a flowchart for describing a processing procedure of the digital video camera according to the first embodiment.
Figure 4B:
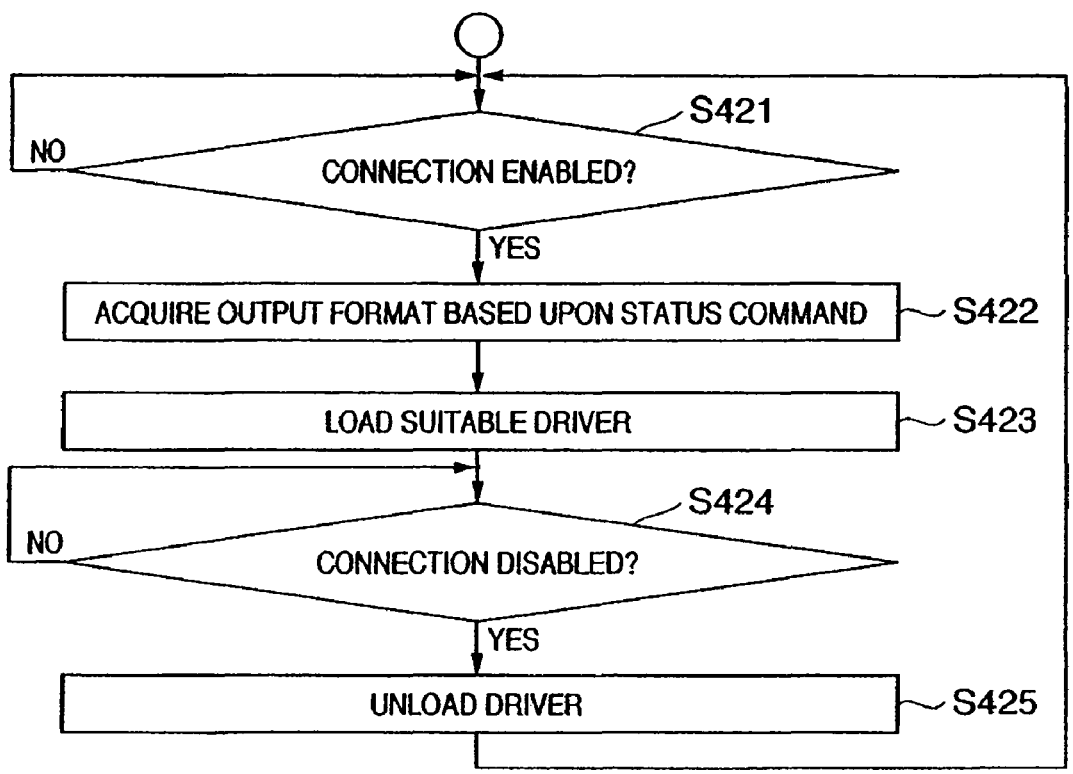
FIG. 4B is a flowchart for describing a processing procedure of the personal computer according to the first embodiment.

The first embodiment is described with regard to flow of processing by the DVC 101 and the PC 103 in a case where the DVC 101 sequentially reproduces the SD video data 301 and the HD video data 302 from the recording medium 104. FIG. 4A is a flowchart describing the processing procedure of the DVC 101. FIG. 4B is a flowchart describing the processing procedure of the PC 103. It should be noted that the controller 905 controls the processing performed by the DVC 101, and the controller 105 controls the processing performed by the PC 102.

Figure 2:
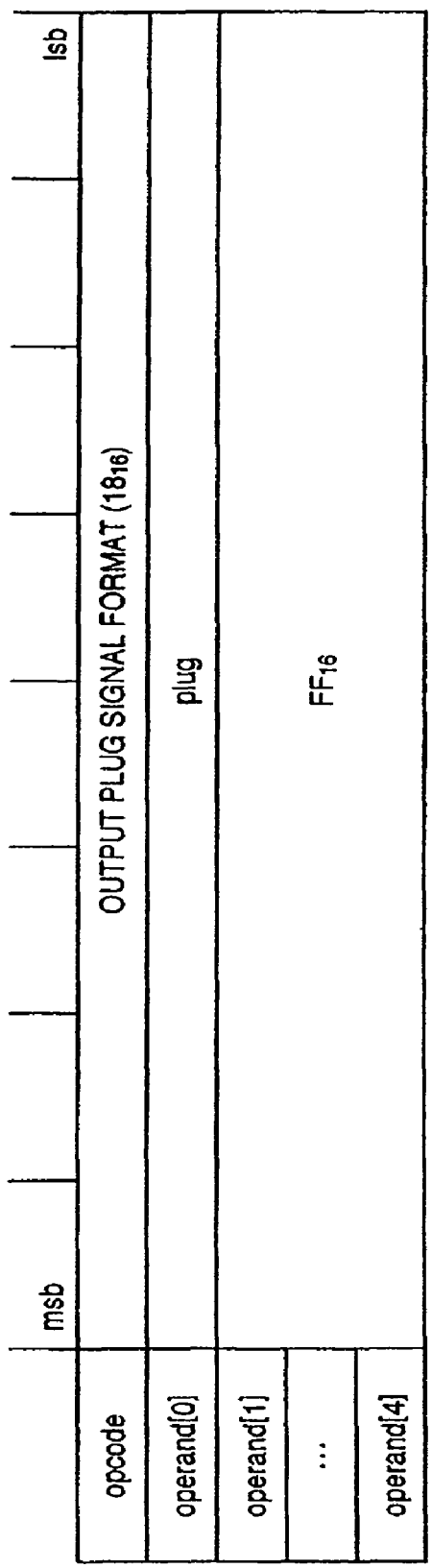
FIG. 2 is a diagram illustrating an OUTPUT PLUG SIGNAL FORMAT status command.

First, the operation of the PC 103 will be described with reference to the flowchart of FIG. 4B. When an electrical connection via the IEEE 1394 interface is set up, the PC 103 acquires device information, etc., relating to connected devices (this processing is not shown). When the DVC 101 is connected, the PC 103 checks and acquires the output format of reproduced video data, which is transmitted or output by the DVC 101, using the OUTPUT PLUG SIGNAL FORMAT status command as shown in FIG. 2 (steps S421, S422). The PC 103 loads the driver (DV driver 106 or MPEG2 driver 107) adapted to the acquired output format (step S423).

The PC 103 subsequently performs monitoring to determine whether the connection status between the PC 103 and the DVC 101 has been disable state. If the disconnected state is attained, then the PC 103 unloads the driver that was loaded at step S423. Control then returns to step S421, at which the PC 103 waits for enabling of a connection between the PC 103 and the DVC 101. If the connection is enabled, steps S422 and S423 are executed and the PC 103 loads the newly adapted driver.

Operation of the DVC 101 will be described next with reference to the flowchart of FIG. 4A. After its power supply is turned on, the DVC 101 is connected to the PC 103 via the IEEE 1394 interface 904. Upon checking the output format from the PC 103, the DVC 101 returns a default output format that has been set in advance (steps S401, S402). In this embodiment, it is assumed that the DV format is reported as the default for the output format.

Then, the DVC 101 starts to reproduce from the recoding medium 104 when an instruction of starting the playback is input to the user interface of the DVC 101, or when the DVC 101 receives a command instructing the start of the playback from the PC 103. First, in the present embodiment, the DVC 101 reproduces the SD video data 301 from the recording medium 104. At this time, the DVC 101 can discriminate the format of the reproducing video data by reading an application ID in an ITI (Insert and Track Information) sector on the magnetic tape. The DVC 101 always checks a change of the output format in the course of reproducing the data in the recording medium 104 (step S403). If the format of the video data from the recording medium 104 does not match with the output format of which the DVC 101 notified the PC 103, the DVC 101 stops outputting the reproduced video data via the IEEE 1394 interface 904, and then, the procedure proceeds to step S404 because it is determined that the format has been changed. If the format of the video data from the recording medium 104 matches with the output format of which the DVC 101 notified the PC 103, the DVC 101 allows to output the reproduced video data via the IEEE 1394 interface 904.

Figure 5:
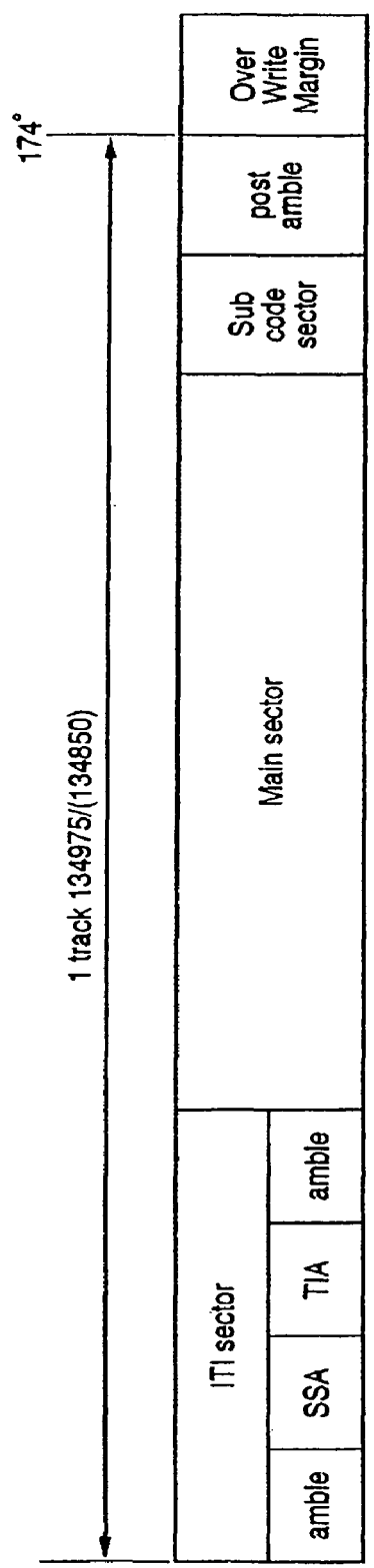
FIG. 5 is a diagram illustrating the structure of one track of a magnetic tape.

FIG. 5 illustrates an example of the arrangement of sectors on one track of recording medium 104, and FIG. 6 illustrates an example of an application ID. A TIA (Track Information Area) is placed in the ITI sector of FIG. 5. Information recorded in the TIA is information representing the format, information indicative of an SP mode or LP mode, and information representing the pattern of a pilot signal of one frame. Furthermore, an application ID comprising $APT_2$, $APT_1$, $APT_0$ bits of the kind shown in FIG. 6 are placed in the TIA. Format information is represented by these three bits. According to this embodiment, if the $APT_2$, $APT_1$, $APT_0$ bits are "000", this indicates the DV format: if these bits are "111", then this indicates the MPEG2 format. Therefore, a change in the format of the video data on the recording medium 104 can be detected by the value of the application ID.

For example, if the reproduced video data has changed from the SD video data 301 to the HD video data 302, the value of the application ID changes from "000" to "111". At step S403, the fact that the format has changed, namely the fact that the format of the reproduced video data has changed, is detected based upon the value of the application ID. If it is detected that the format of the reproduced video data is changed, then control proceeds to step S404, at which TPA, TPA* bias of the IEEE 1394 interface 904 is turned off.

Also, although the DVC 101 continues reproducing the video data stored in the recording medium 104 even if a format change of the reproduced video data was detected, the DVC 101 stops outputting the reproduced video data via the IEEE 1394 interface 904 until the processing in step S405 (the second bus reset) is finished. It should be noted that the output of the reproduced video data from the IEEE 1394 interface 904 may be stopped until a predetermined time elapses after the processing in step S405 (the second bus reset) is finished. Furthermore, it is possible that the output of the reproduced video data from the IEEE 1394 interface 904 is stopped until the PC 103 loads an appropriate driver. Of course, reproducing from the recording medium 104 may be stopped when the format change of the reproduced video data is detected.

Figure 7:
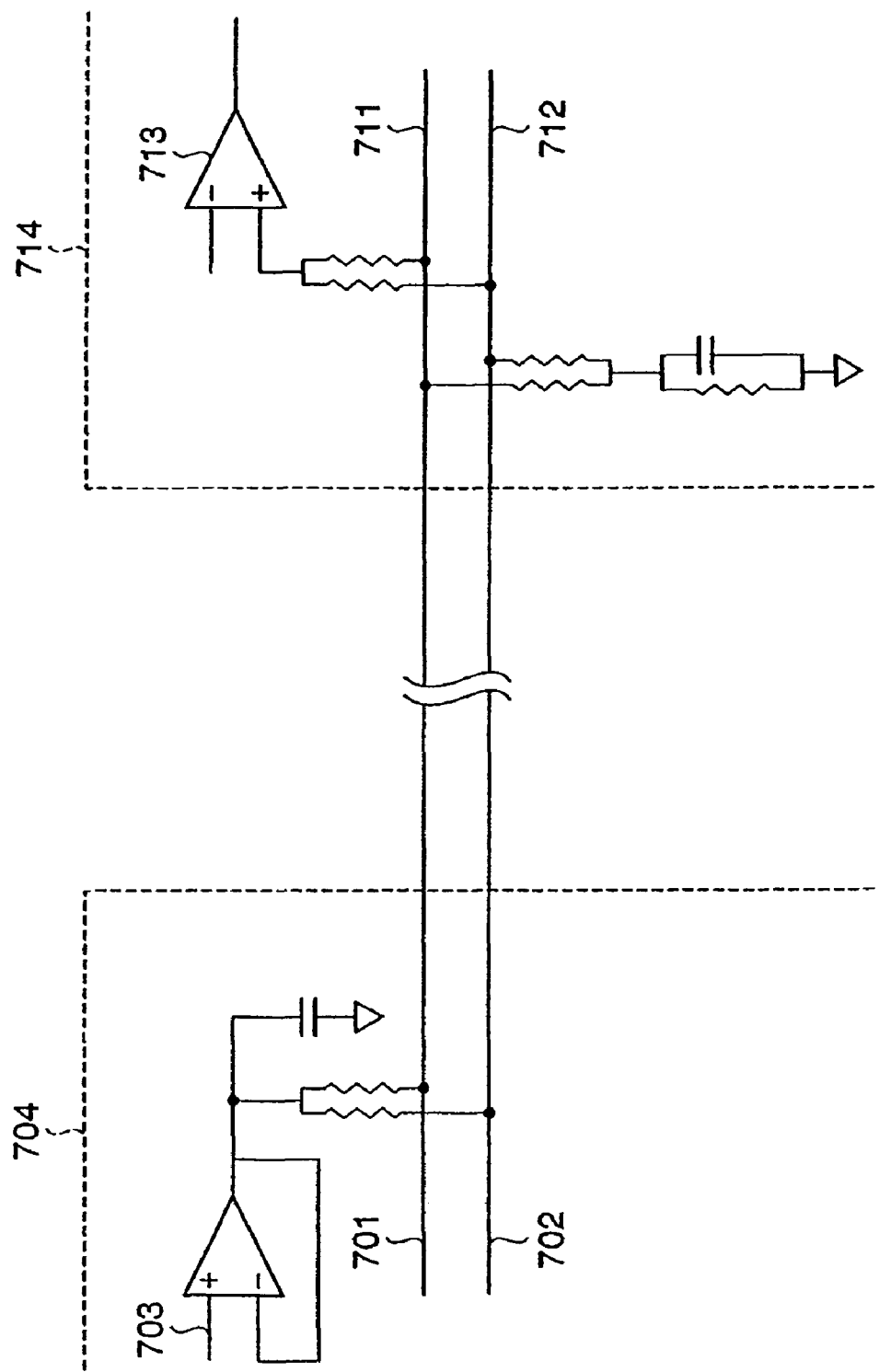
FIG. 7 is a diagram illustrating the electrical connections of an IEEE 1394 interface.

FIG. 7 illustrates a state in which TPA 701, TPA* 702 of the IEEE 1394 interface 904 possessed by the DVC 101 of this embodiment have been connected to TPB 711, TPB* 712 of the IEEE 1394 interface possessed by PC 103. According to the IEEE 1394 standard, when the TPA 701, TPA* 702 are biased, the bias is detected by a comparator 713 connected to TPB 711, TPB* 712 on the side of the PC 103 and, hence, the connection of the device is detected. If the device is compliant with IEEE 1394 standard, therefore, the bias of TPA 701, TPA* 702 is turned off. That is, by making 0 V the input voltage to a terminal 703, the DVC 101 is placed in an unconnected state or is placed in a suspended or disabled state. In other words, the connection of the DVC 101 is placed in a disabled state. As a result, the PC 103 recognizes severance of the connection to the DVC 101 by the IEEE interface and unloads the driver (DV driver 106 or MPEG2 driver 107) that has been loaded (steps S424, S425). That is, the PC 103 unloads the driver (DV driver 106 or MPEG2 driver 107) upon occurrence of bus reset. Thus, because the PC 103 can unload the driver (DV driver 106 or MPEG2 driver 107) when a bus reset occurred, the problems such as freeze of PC 103 can be avoided.

With reference again to FIG. 4A, the DVC 101 biases the TPA 701, TPA* 702 of the IEEE 1394 interface 904 again, i.e., inputs a stipulated voltage from terminal 703, at step S405. Thus, the bus reset defined by IEEE 1394 standard is commenced again. It is assumed that the time during which the connection is in the disabled state is made long enough for the unloading of the driver by the PC 103 to be completed. After the PC 103 recognizes that the DVC 101 has been electrically connected, the PC 103 queries the DVC 101 with regard to the output format (steps S421, S422). For example, the OUTPUT PLUG SIGNAL FORMAT status command as shown in FIG. 2 is sent to the DVC 101 in the manner described above.

Control proceeds to step S406 in the DVC 101, which waits for acquisition of the output format. When the output format is acquired, the DVC 101 reports the output format to the PC 103 at step S407. In step S407, DVC 101 notifies the PC 103 of the format of the reproduced video data stored in the recording medium 104 as the output format. When the format of the video data reproduced from the recording medium 104 is MPEG2 format, the fact that the output format is the MPEG2 format is reported to the PC 103. In response, the PC 103 is capable of loading the MPEG2 driver 107 in order to capture the HD video data 302 (step S423).

It should be noted that although the OUTPUT PLUG SIGNAL FORMAT status command is used as an example of a command for querying about the output format in this example, this does not impose a limitation. Further, a connection between the DVC 101 and the PC 103 is disabled or enabled by controlling bias provided to the TPA 701 and TPA* 702, control may be achieved by another method. For example, it is possible to so arrange it that a transition is made to the disabled state by changing over a signal line to a high impedance utilizing a switching transistor.

Further, in the embodiment described above, whether the format of the reproduced video data is the DV format or MPEG2 format is discriminated by the three bits $APT_2$, $APT_1$, $APT_0$. However, it can be so arranged that it is discriminated whether the format of the reproduced video data is the SD format, the SDL format, the HD1 format or the HD2 format. The SD format and the SDL format are defined by DV format, HD1 format is the format for handling the 720P high definition data compressed in the MPEG2 format, and HD2 format is the format for handling the 1080i high definition data compressed in the MPEG2 format.

Thus, in accordance with the DVC 101 in the first embodiment, if it is detected that the format of the reproduced video data is changed, the DVC 101 occurs the bus reset and temporarily disconnects the connection between the DVC 101 and the PC 103. As a result, processing of reproduced video data by the PC 103 is initialized and a driver suited to the format after a change can be loaded in the PC 103. Accordingly, the PC 103 is capable of automatically supporting a changed format.

SECOND EMBODIMENT

In the first embodiment described above, a change in output format of reproduced video data is detected by reading format information (an application ID) included in the reproduced video data. In a second embodiment, it is construed that the output format has changed if the lock mode has been set or cancelled via a user interface possessed by the DVC 101, in which case the driver is reloaded in the PC 103.

In this embodiment, in a case where the DVC 101 has locked the format to the DV format, the reproduced video data is output in the DV format as usual while the SD video data 301, 303 is reproduced. During the time that the HD video data 302 is produced, an isochronous packet (a null packet) that contains only a CIP (Common Isochronous Packet) header (see IEC 61883-1 and IEC 61883-2) indicative of the DV format is output. Thus, because the output data from the DVC 101 will be output in the DV format, the PC 103 will not have any problems even where the PC 103 does not change the driver to the MPEG2 driver 107.

Similarly, if the DVC 101 is locked in MPEG2 format, the reproduced video data are output in MPEG2 format as usual while reproducing HD video data 302, and an isochronous packet (a null packet) that contains only CIP (Common Isochronous Packet) header (cf. ICE 61833-1 and IEC 61883-4) indicative of MPEG 2 format is output while reproducing the SD video data 301 or 303.

Figure 8:
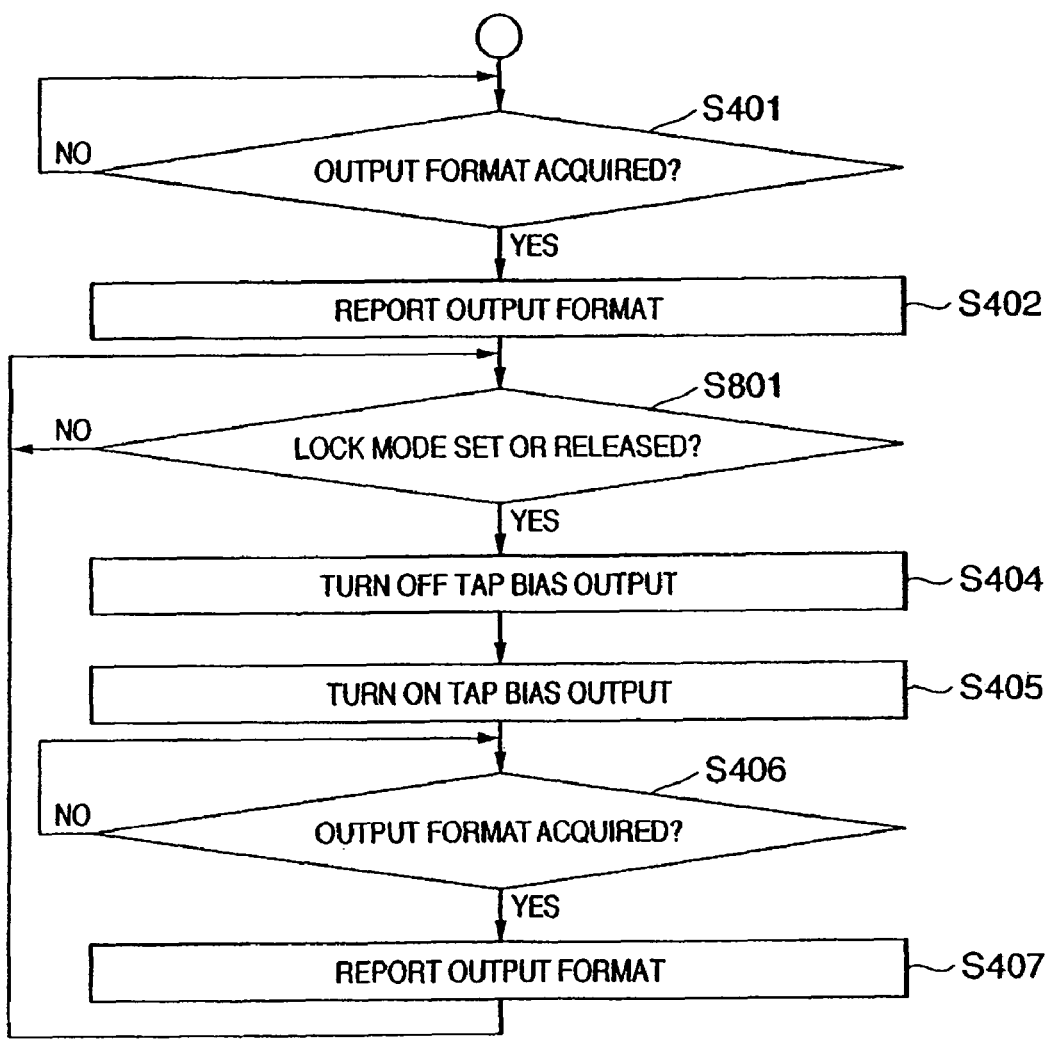
FIG. 8 is a flowchart for describing a processing procedure of the digital video camera according to the second embodiment.

FIG. 8 is a flowchart useful in describing processing executed by the DVC 101 according to the second embodiment. It is assumed here that the PC 103 loads the DV driver 106 when the electrical connection between the DVC 101 is enabled. Also, it is assumed that the DVC 101 is set in the DV lock mode. If the DVC 101 reproduces the HD video data 302 under these conditions, the DVC 101 is set in the DV lock mode and therefore an isochronous packet (a null packet) that contains only a CIP header (see IEC 61883-1 and IEC 61883-2) indicative of the DV format is output. That is, the DVC 101 outputs the isochronous packet (a null packet) that contains only the CIP header indicative of the DV format instead of outputting the HD video data 302.

If it is detected at step S801 that the DV lock mode in the DVC 101 is cancelled or that the output format has been locked to the MPEG2 format (that the mode has been changed over to the MPEG2 lock mode) under these conditions, control proceeds to step S404. That is, processing proceeds from step S801 to step S404 if a state in which a change in the output format can occur is attained. Processing from step S404 onward is similar to that of the first embodiment (FIG. 4A), and the IEEE 1394 interface 904 is placed in the disabled state (step S404). At this time, although the DVC 101 continues to reproduce the recording medium 104, the DVC 101 stops outputting the reproduced data from the recording medium 104 via the IEEE 1394 interface 904. As a result, the PC 103 recognizes severance of the connection to the DVC 101 and unloads the DV driver 106 (steps S424, S425).

Next, the DVC 101 restores the IEEE 1394 interface 904 to the enabled state at step S405. In response, the PC 103 recognizes that the DVC 101 has been electrically connected and queries the DVC 101 with regard to the output format (steps S421, S422). For example, the OUTPUT PLUG SIGNAL FORMAT status command as shown in FIG. 2 is sent to the DVC 101 in the manner described above. Then, in step S407, the DVC 101 notifies the PC 103 of the format of video data being reproduced from the recording medium 104 as the output format. If the format of the video data being reproduced from the recording medium is the MPEG2 format, the DVC 101 notifies the PC 103 that the output format is MPEG2 format. As a result, the PC 103 is capable of loading the MPEG2 driver 107 in order to capture the HD video data 302 (step S423). It should be noted that although the OUTPUT PLUG SIGNAL FORMAT status command is mentioned as an example of a command for querying about the output format in this example, this does not impose a limitation.

Further, the following cases can be mentioned as conditions for advancing from step S801 to step S404 in the second embodiment: For example, (i) a case where the PC 103 has loaded the MPEG2 driver 107 and the mode is changed to the DV lock mode while the DVC 101 in the MPEG2 lock mode is reproducing HD video data; (ii) a case where the PC 103 has loaded the MPEG2 driver 107 and the mode is changed to the DV clock mode while the DVC 101 in the unlock mode is reproducing HD video data; (iii) a case where the PC 103 has loaded the MPEG2 driver 107 and the mode is changed to the unlock mode while the DVC 101 in the MPEG2 lock mode is reproducing SD video data; (iv) a case where the PC 103 has loaded the MPEG2 driver 107 and the mode is changed to the DV lock mode while the DVC 101 in the MPEG2 lock mode is reproducing SD video data; (v) a case where the PC 103 has loaded the DV driver 106 and the mode is changed to the MPEG2 lock mode while the DVC 101 in the DV lock mode is reproducing SD video data; and (vi) a case where the PC 103 has loaded the DV driver 106 and the mode is changed to the MPEG2 lock mode while the DVC 101 in the unlock mode is reproducing SD video data.

In the second embodiment, an null packet is assumed with regard to output of HD video data in the case of the DV lock mode and with regard to output of SD video data in the case of the MPEG2 lock mode. However, this does not impose a limitation upon the invention. "Video data is output in only one format" and "no video data is output in formats other than this format" apply to the meaning of "locked". Accordingly, an null packet need not necessarily be output, and behavior in which output is halted with respect to video data in a format differs from that of the lock state can also be regarded as the lock mode in this embodiment.

THIRD EMBODIMENT

Setting and release of the lock mode described in the second embodiment are carried out via a user interface possessed by the DVC 101 itself. However, this can also be carried out in response to an indication from the PC 103. In a case where the lock mode is set or released from the PC 103, the PC 103 is capable of recognizing a change in the lock mode and it will suffice to load and unload the driver in accordance with the change recognized. Accordingly, in a third embodiment, when the internal lock mode has been set or released via a user interface possessed by the PC 103, this is construed as indicating when the output format changed.

Processing executed by the DVC 101 in the third embodiment is substantially the same as that of the flowchart (FIG. 8) described in the second embodiment; only the processing of step S801 in FIG. 8 is different. Regarding the present embodiment, the differences from the second embodiment will be described.

In step S801, in a case where the lock mode has been released or a change to another lock mode has been made by a command from the PC 103, the PC 103 itself can recognize the change in the lock mode. In this case, because the PC 103 can load an appropriate driver, the DVC 101 skips the processing of steps S404 to S407, and returns to step S801.

By virtue of the operation set forth above, the PC 103 is capable of loading a driver that supports the format that prevails after the change in lock mode.

In accordance with the foregoing embodiments, as described above, it is possible for the driver on the PC 103 to be changed over appropriately.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-420210 filed on Dec. 17, 2003, which is hereby incorporated by reference herein.

The invention claimed is:

1. A video data reproducing apparatus, comprising:
   a reproducing unit that reproduces first video data from a recording medium, and reproduces second video data from the recording medium;
   an interface unit that transmits the first video data reproduced from the recording medium to an external apparatus if a format of the first video data is matched with an output format of the video data reproducing apparatus;
   a detecting unit that detects whether or not a format of the second video data is different from the format of the first video data when the second video data is reproduced from the recording medium after the first video data is reproduced from the recording medium; and
   a control unit that controls the interface unit so as to disconnect a connection between the external apparatus and the video data reproducing apparatus without causing the reproducing unit to stop reproducing the second video data from the recording medium if the detecting unit detects that the format of the second video data is different from the format of the first video data.

2. The video data reproducing apparatus according to claim 1, wherein the interface unit is compliant with the IEEE 1394 standard.

3. The video data reproducing apparatus according to claim 1, wherein the format of the first video data corresponds to a DV format, and the format of the second video data corresponds to a MPEG2 format.

4. The video data reproducing apparatus according to claim 1, wherein the interface unit stops transmitting the second video data to the external apparatus if the detecting unit detects that the format of the second video data is different from the format of the first video data.

5. The video data reproducing apparatus according to claim 1, wherein the video data reproducing apparatus includes a video camera.

6. The video data reproducing apparatus according to claim 1,
   wherein the interface unit stops transmitting the first video data reproduced from the recording medium to the external apparatus if the format of the first video data is not matched with the output format of the video data reproducing apparatus, and
   wherein the control unit controls the interface unit so as to disconnect the connection between the external apparatus and the video data reproducing apparatus if the format of the first video data is not matched with the output format of the video data reproducing apparatus.

7. A method of controlling a video data reproducing apparatus having an interface unit and a reproducing unit, the method comprising:
   a step of controlling the reproducing unit to reproduce first video data from a recording medium, and controlling the reproducing unit to reproduce second video data from the recording medium;
   a step of controlling the interface unit to transmit the first video data reproduced from the recording medium to an external apparatus if a format of the first video data is matched with an output format of the video data reproducing apparatus;
   a detecting step of detecting whether or not format of the second video data is different from the format of the first video data when the second video data is reproduced from the recording medium after the first video data is reproduced from the recording medium; and
   a step of controlling the interface unit so as to disconnect a connection between the external apparatus and the video data reproducing apparatus without causing the reproducing unit to stop reproducing the second video data from the recording medium if it is detected in the detecting step that the format of the second video data is different from the format of the first video data.

8. The method according to claim 7, wherein the interface unit is compliant with the IEEE 1394 standard.

9. The method according to claim 7, wherein the format of the first video data corresponds to a DV format, and the format of the second video data corresponds to a MPEG2 format.

10. The method according to claim 7, further comprising a step of controlling the interface unit to stop transmitting the second video data to the external apparatus if it is detected in the detecting step that the format of the second video data is different from the format of the first video data.

11. The method according to claim 7, wherein the video data reproducing apparatus includes a video camera.

12. The method according to claim 7, further comprising:
   a step of controlling the interface unit to stop transmitting the first video data reproduced from the recording medium to the external apparatus if the format of the first video data is not matched with the output format of the video data reproducing apparatus; and
   a step of controlling the interface unit so as to disconnect the connection between the external apparatus and the video data reproducing apparatus if the format of the first video data is not matched with the output format of the video data reproducing apparatus.

* * * * *